United States Patent Office 3,597,442
Patented Aug. 3, 1971

3,597,442
METHOD FOR THE PREPARATION OF 2-ARYLBENZIMIDAZOLES
Ronald J. McCaully, Malvern, Pa., assignor to American Home Products Corporation, New York, N.Y.
No Drawing. Filed Oct. 31, 1968, Ser. No. 772,399
Int. Cl. C07d 49/38
U.S. Cl. 260—309.2         3 Claims

ABSTRACT OF THE DISCLOSURE

The disclosure describes a method for the direct conversion of o-aminobenzophenone oximes into 2-arylbenzimidazoles. The conversion is carried out by warming a solution of an appropriately substituted o-aminobenzophenone oxime in trifluoroacetic acid on a steam bath for two to eighteen hours. Evaporation of the excess trifluoroacetic acid, and treatment of the residue with ether affords a trifluoroacetate salt of the substituted benzimidazole. Conventional methods may be used to convert the salt to the free base. The products are useful as anthelmintics.

---

The present invention is directed to a chemical process and more particularly is directed to a chemical process for the production of 2-aryl-benzimidazoles.

The benzimidazoles are a class of compounds that have shown wide utility as medicinal chemicals. Particularly, they are useful as anthelmintics, as is well known in the art. See, for instance, Annual Reports in Medicinal Chemistry, 1965, Academic Press, New York, 1966, pp. 150–152.

The closest prior art of which the inventor is aware is the preparation of imidazoles as described in R.C. Elderfield, "Heterocyclic Compounds V," John Wiley & Sons, New York, 1957, at pages 257-297. The present process starts with o-aminobenzophenone oximes and is therefore distinguishable from the prior art in which the synthesis started with o-phenylenediamines or o-nitroanilines.

As used herein the terms α-oxime and β-oxime define compounds having the following structures:

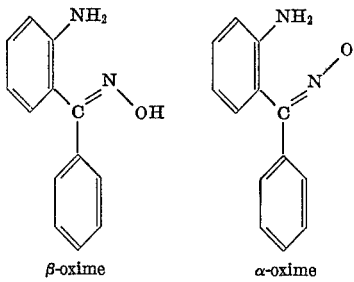

β-oxime                α-oxime

The β-oxime of the benzophenone has the hydroxyl in the anti position with respect to the o-aminophenyl ring. The α-oxime of the benzophenone has the hydroxyl in the syn position with respect to the o-aminophenyl ring.

The process differs from the prior art in that it affords a direct method for conversion of an o-aminobenzophenone oxime to a benzimidazole. Since the oximes may be prepared to have substitution patterns that differ from the substitution patterns of the staring materials of the prior art methods, the present process affords a route to novel benzimidazoles.

The invention comprises a novel method for the direct conversion of o-aminobenzophenone oximes into 2-arylbenzimidazoles. The conversion is carried out by warming a substantially anhydrous solution of an appropriately substituted o-aminobenzophenone oxime in a low boiling strong acid. Upon completion of the reaction the product may be separated by well known means. For instance, the reaction mixture may be poured into crushed ice and neutralized with sodium hydroxide. The product may be recovered by filtration.

In a particularly advantageous embodiment trifluoroacetic acid is utilized and the solution is heated on a steam bath for about 2–18 hours. Evaporation of the excess trifluoroacetic acid and treatment of the residue with ether affords a trifluoroacetate salt of the substituted benzimidazole. Conventional methods may be used to convert the salt to the free base.

Without wishing to be bound by a theory of operation, an explanation of the mechanism of the reaction is believed to be as follows and schematically illustrated below. Isomerization of α-oxime (I) to β-oxime (II) occurs. Protonation of the oxime hydroxyl with removal of water is followed by migration of the o-aminophenyl group and ring closure of the o-amino group on stabilized carbonium ion (III) and (IV). When the reaction is complete, the product 2-arylbenzimidazole (V) may be recovered by well-known techniques.

The process may be schematically illustrated:

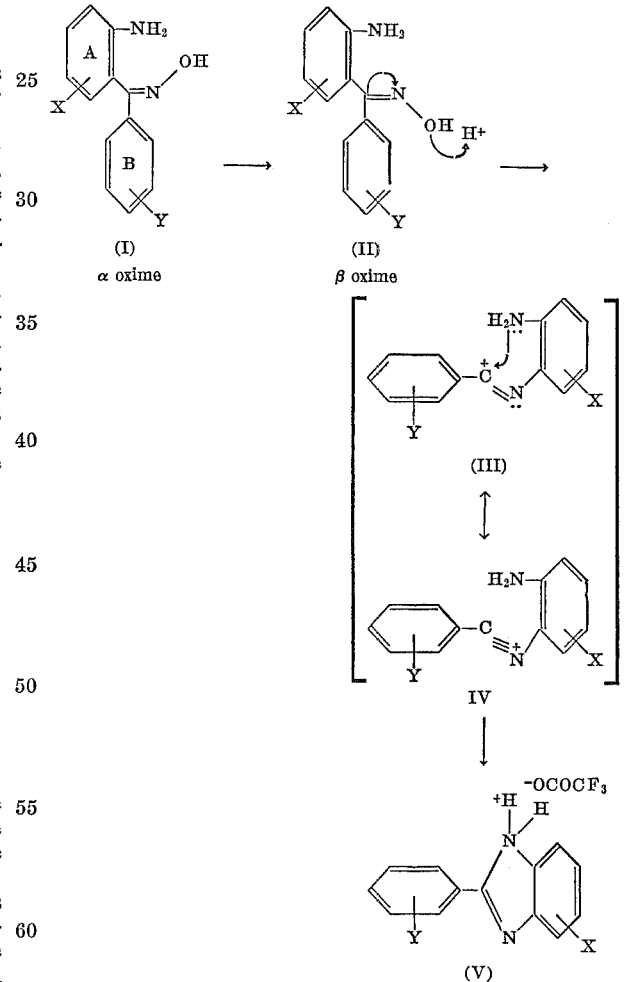

In the above illustration, X and Y are the same or different members selected from the class consisting of hydrogen, halogen, hydroxy, lower alkyl, lower alkoxy, acylamido, sulfonamido and nitro, provided ring A has as many or more electron donating substituents as does ring B, and further provided that where the substituent is hydroxy or acylamido the X substituent is not in the 6-position and the Y substituent is not in the 2′ or 6′ position. When electron withdrawing groups are present they should be on ring B.

Preparation of 2-arylbenzimidazoles has been achieved from both α- and β-oximes; however, the β-oxime is converted more rapidly to afford the benzimidazole in higher yield than is the α-oxime. β-oxime precursors such as 6-chloro-1,2-dihydro-2,2-dimethyl-4-phenylquinazoline-3-oxide behave similarly to the β-oxime. The reactant may comprise of one or more members selected from the class consisting of α-o-aminobenzophenone oxime, β-o-aminobenzophenone oxime, mixtures of α- and β-o-aminobenzophenone oximes and precursors of the foregoing. It is most practical, however, to use the α,β-oxime mixture that is obtained from reaction of hydroxylamine with an o-aminobenzophenone.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLES 1–7

The following example illustrates the production of 5(6)-chloro-2-phenylbenzimidazole by the method of the present invention. The amounts of reactants, reaction times and yields are shown in Table 1.

2-amino-5-chlorobenzophenone oxime was mixed with trifluoroacetic acid and heated on a steam bath at reflux. The excess trifluoroacetic acid was evaporated on a rotary evaporator and the residue treated with ether. Filtration afforded the trifluoroacetate of 5(6)chloro-2-phenylbenzimidazole, having a melting point of 190–192° C.

Based on the formula $C_{15}H_{10}ClF_3N_2O_2$, it was calculated that the elemental analysis by weight would be 52.57 percent carbon, 2.94 percent hydrogen, and 8.19 percent nitrogen. The product was analysed and the content was found to be 52.68 percent carbon, 3.01 percent hydrogen and 8.18 percent nitrogen. The foregoing may be expressed:

*Analysis.*—Calcd. for $C_{15}H_{10}ClF_3N_2O_2$ (percent): C, 52.57; H, 2.94; N, 8.19. Found (percent): C, 52.68; H, 3.01; N, 8.18.

Addition of aqueous sodium bicarbonate to an ethanol solution of the salt afforded 5(6)-chloro-2-phenylbenzimidazole having a melting point of 212–214° C. In the literature the same compound is described as having a melting point of 210° C. K. Dziewonski and L. Sternbach, Bull. Intern. Acad. Polanaise, Classe Sci. Math. Nat. 1935 A, 333. [Chemical Abstracts 30, 2971 (1936)].

*Analysis.*—Calcd. for $C_{13}H_9ClN_2$ (percent): C, 68.25; H, 3.97; N, 12.25. Found (percent): C, 68.00; H, 4.00; N, 12.26.

EXAMPLE 8

The following example illustrates the preparation of 5(6)-chloro-2-(o-chlorophenyl)benzimidazole by the process of the present invention. A solution of 5.63 g. (0.02 mole) of a mixture of the α and β-oximes of 2-amino-2′,5-dichlorobenzophenone in 50 ml. of trifluoroacetic acid was refluxed for 18 hours on a steam bath. After evaporation of the excess acid and treatment of the residue with ether, 3.0 g. of 5(6)-chloro-2-(o-chlorophenyl)benzimidazole trifluoroacetate was obtained as off-white crystals having a melting point of 142–144° C.

A solution of the product in 35 ml. of ethanol was adjusted to pH 7.5 with sodium bicarbonate to afford 2.0 g. of 5(6)-chloro-2-(o-chlorophenyl)benzimidazole, having a melting point of 126–128° C. In the literature the same compound is described as having a melting point of 125° C., N. V. Subba Rao and C. V. Ratnam, Proc. Indian Acad. Sci. 48 A 256 (1958); Chemical Abstracts, 53, 18013b (1959).

EXAMPLES 9–31

Following the procedure of Example 1 but substituting appropriate starting materials for 2-amino-5-chlorobenzophenone oxime products may be obtained where X and Y are the following groups:

| Ex. | X | Y | Ex. | X | Y |
|---|---|---|---|---|---|
| 9 | H | Cl | 21 | Cl | $NO_2$ |
| 10 | H | Br | 22 | Br | $C_4H_9$ |
| 11 | H | I | 23 | I | $NH_2COCH_3$ |
| 12 | $CH_3$ | $CH_3$ | 24 | $NH_2COCH_3$ | $C_3H_7$ |
| 13 | $C_2H_5$ | $CH_3$ | 25 | $NH_2COCH_3$ | $NH_2COCH_3$ |
| 14 | $OCH_3$ | $CH_3$ | 26 | $OC_2H_5$ | $OCH_3$ |
| 15 | $OC_2H_5$ | $C_2H_5$ | 27 | OH | OH |
| 16 | $OC_2H_5$ | $C_3H_7$ | 28 | $SO_2NH_2$ | $SO_2NH_2$ |
| 17 | OH | Cl | 29 | $NO_2$ | $NO_2$ |
| 18 | OH | $CH_3$ | 30 | $OC_3H_7$ | $NO_2$ |
| 19 | $CH_3$ | $NO_2$ | 31 | $OC_4H_9$ | $SO_2NH_2$ |
| 20 | $C_3H_7$ | $SO_2NH_2$ | | | |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method for the direct conversion of substituted o-aminobenzophenone oximes into substituted 2-phenyl-benzimidazoles comprising the step of:
    warming a solution of a reactant comprising one or more members selected from the class consisting of α-o-aminobenzophenone oxime, β-o-aminobenzophenone oxime, mixtures of α- and β-o-aminobenzophenone oximes and precursors of the foregoing in trifluoroacetic acid at the reflux temperature for 1 to 18 hours.

2. A method which comprises heating in trifluoroacetic acid until the reaction is substantially complete a compound of the formula

TABLE 1

| Example | Configuration of oxime | Moles oxime | Amt. of $CF_3COOH$, ml. | Reaction time | Yield of the benzimidazole $CF_3COOH$ | |
|---|---|---|---|---|---|---|
| | | | | | Grams | Percent |
| 1 | β | 0.02 | 30 | 18 | 5.6 | 81.6 |
| 2 | α plus β mixture | 0.04 | 60 | 18 | 5.9 | 43 |
| 3 | α | 0.02 | 30 | 18 | 1.35 | 19.7 |
| 4 | α plus β mixture | 0.01 | 25 | 1 | 0.4 | 11.7 |
| 5 | do | 0.01 | 25 | 2 | 0.7 | 20.2 |
| 6 | do | 0.01 | 25 | 4½ | 1.05 | 30.6 |
| 7 | β [1] | 0.01 | 25 | 2 | 1.1 | 32.1 |

[1] The starting material was actually 6-chloro-1,2-dihydro-2,2-dimethyl-4-phenylquinazolin-3-oxide and affords the β-oxime in acid.

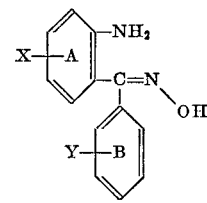

(I)

where X and Y are the same or different members selected from the class consisting of hydrogen, halogen, hydroxy, lower alkyl, lower alkoxy, acylamido, sulfonamido and nitro, provided ring A has as many or more electron donating substituents as does ring B, and further provided that where the substituent is hydroxy or acylamido the X substituent is not in the 6-position and the Y substituent is not in the 2′ or 6′ position, to form a compound having the formula

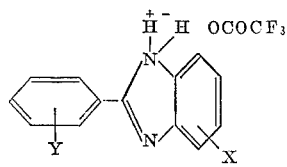

(II)

where X and Y are as defined above.

3. A method as defined in claim 2 which comprises heating a β-o-aminobenzophenone oxime in trifluoroacetic acid for 1 to 18 hours to form a 2-arylbenzimidazole.

References Cited

Sternbach et al., J. Org. Chem. 26, 4936–41 (1961).

HENRY R. JILES, Primary Examiner

G. T. TODD, Assistant Examiner

U.S. Cl. X.R.

260—566A; 424—273